(12) United States Patent
Furesawa (10) Patent No.: US 9,816,416 B2
(45) Date of Patent: Nov. 14, 2017

(54) CONTROL APPARATUS AND CONTROL METHOD FOR REDUCING AGENT SUPPLY APPARATUS

(71) Applicant: Bosch Corporation, Tokyo (JP)

(72) Inventor: Nobuaki Furesawa, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 14/896,528

(22) PCT Filed: May 19, 2014

(86) PCT No.: PCT/JP2014/063197
§ 371 (c)(1),
(2) Date: Dec. 7, 2015

(87) PCT Pub. No.: WO2014/199778
PCT Pub. Date: Dec. 18, 2014

(65) Prior Publication Data
US 2016/0123204 A1    May 5, 2016

(30) Foreign Application Priority Data

Jun. 10, 2013  (JP) ................. 2013-122151

(51) Int. Cl.
*F01N 3/20*    (2006.01)

(52) U.S. Cl.
CPC ........... *F01N 3/2013* (2013.01); *F01N 3/208* (2013.01); *F01N 3/2066* (2013.01);
(Continued)

(58) Field of Classification Search
CPC .... F01N 3/2013; F01N 3/208; F01N 2610/02; F01N 2610/10; F01N 2610/105;
(Continued)

(56) References Cited

U.S. PATENT DOCUMENTS

| 8,234,854 B2 * | 8/2012 | Kesse ................. F01N 3/208 60/286 |
| 2011/0236280 A1 * | 9/2011 | Gotan ............. B01D 53/9409 423/212 |

FOREIGN PATENT DOCUMENTS

| EP | 1806487 | 7/2007 |
| JP | 2006017043 | 1/2006 |

(Continued)

OTHER PUBLICATIONS

International Search Report for Application No. PCT/JP2014/063197 dated Aug. 19, 2014 (English Translation, 2 pages).

*Primary Examiner* — Brandon Lee
(74) *Attorney, Agent, or Firm* — Michael Best & Friedrich LLP (57) ABSTRACT

The control method for reducing agent supply apparatuses, when a liquid reducing agent is frozen, unfreezes the frozen liquid reducing agent using a heating device and enables the injection control of the liquid reducing agent in an exhaust passage of the internal combustion engine. The control method includes determining the necessity of unfreezing of the liquid reducing agent and calculating the necessary time required for the unfreezing when the speed of the internal combustion engine exceeds a predetermined threshold during startup of the internal combustion engine and permitting the injection control of the liquid reducing agent when the unfreezing is not necessary or the unfreezing is completed.

6 Claims, 5 Drawing Sheets

(52) U.S. Cl.
CPC ...... *F01N 2610/02* (2013.01); *F01N 2610/10* (2013.01); *F01N 2610/105* (2013.01); *F01N 2610/1486* (2013.01); *F01N 2900/08* (2013.01); *Y02T 10/24* (2013.01)

(58) Field of Classification Search
CPC ......... F01N 2610/1486; F01N 2900/08; F01N 3/2066; Y02T 10/24
See application file for complete search history.

(56) References Cited

FOREIGN PATENT DOCUMENTS

| | | |
|---|---|---|
| JP | 2008180110 | 8/2008 |
| JP | 2008248710 | 10/2008 |
| JP | 2011241740 | 12/2011 |
| WO | 2010035355 | 4/2010 |

\* cited by examiner

41 : SWITCH SENSING MEANS
43 : SPEED DETECTION MEANS
45 : UNFREEZING NECESSITY DETERMINATION MEANS
47 : UNFREEZING TIME CALCULATION MEANS
49 : UNFREEZING CONTROL MEANS
51 : INJECTION PERMITTING MEANS

S11: RESET UNFREEZING STATE
S13: CLEAR T AND T_thre
    CALCULATE T_thre
    DETERMINE NECESSITY OF UNFREEZING CONTROL
S14: UNFREEZING CONTROL IS NECESSARY?
S15: START TIMER COUNT
S16: TIMER VALUE T ≥ T_thre?
S17: UNFREEZING IS COMPLETED
    UPDATE UNFREEZING STATE
S18: PERMIT INJECTION CONTROL
S20: CLEAR UNFREEZING STATE

CONTROL APPARATUS AND CONTROL METHOD FOR REDUCING AGENT SUPPLY APPARATUS

BACKGROUND OF THE INVENTION

The present invention relates to a control apparatus and control method for reducing agent supply apparatuses supplying a liquid reducing agent derived from ammonia to the exhaust passage of an internal combustion engine.

There is a known exhaust purifying apparatus including a selective reduction catalyst disposed in the exhaust passage of an internal combustion engine and a reducing agent supply apparatus for injecting a liquid reducing agent derived from ammonia such as a aqueous urea solution disposed upstream of the selective reduction catalyst as one of an exhaust purifying apparatuses purifying $NO_X$ in an exhaust gas exhausted from an internal combustion engine such as a diesel engine installed in vehicle or the like. This exhaust purifying apparatus performs an efficient reduction reaction between $NO_X$ in an exhaust gas and ammonia in the selective reduction catalyst and decomposes the $NO_X$ into in nitrogen, water, and so on.

When using as an aqueous urea solution as a liquid reducing agent, the aqueous urea solution is adjusted to have a concentration giving the lowest freeze temperature to minimize the freezing of the aqueous urea solution. However, since the freeze temperature of the aqueous urea solution is at least −11 degrees or so, the aqueous urea solution may be frozen while the reducing agent supply apparatus stops supplying the aqueous urea solution in cold climate areas or the like. When the liquid reducing agent is frozen, the unfreezing control of the frozen liquid reducing agent is performed to enable injection control (see JP-A-2008-180110, for example).

SUMMARY OF THE INVENTION

The necessity of the unfreezing of the liquid reducing agent (that is, whether the liquid reducing agent is frozen) is determined depending on, for example, whether the atmospheric temperature is lower than the threshold for determining the freezing of liquid reducing agent. However, if the necessity of the unfreezing of the liquid reducing agent is determined during turn-on of the startup switch of the internal combustion engine, when the internal combustion engine is not started up for a long time after the startup switch is turned on, unfreezing control may no longer be performed. That is, even when unfreezing control is determined to be unnecessary immediately after the startup switch is turned on, if the atmospheric temperature drops over time, even though there is a need to wait for unfreezing, injection control may be started without waiting for unfreezing. This may prevent the purification control of $NO_X$ from being performed appropriately.

Accordingly, an object of the invention is to provide a control apparatus and control method for reducing agent supply apparatuses that, even when an internal combustion engine is not started up for a long time in a state in which the startup switch thereof is on, can start injection control after appropriately waiting for unfreezing if the reducing agent is frozen.

According to the present invention, to solve the above problems, there is provided a control apparatus for reducing agent supply apparatuses that, when a liquid reducing agent is frozen, unfreezes the frozen liquid reducing agent using a heating device and enables injection control of the liquid reducing agent in an exhaust passage of an internal combustion engine, the control apparatus characterized by including speed detection means for detecting a speed of the internal combustion engine, unfreezing necessity determination means for determining necessity of unfreezing of the liquid reducing agent, unfreezing time calculation means for calculating a necessary time required to unfreeze the liquid reducing agent, and injection permitting means for giving a permission instruction for injection control of the liquid reducing agent, in which, when the speed of the internal combustion engine exceeds a predetermined threshold during startup of the internal combustion engine, the unfreezing necessity determination means determines the necessity of the unfreezing, the unfreezing time calculation means calculates the necessary time, and, when the unfreezing is not necessary or the unfreezing is completed, the injection permitting means permits injection control.

In addition, in configuring the control apparatus for reducing agent supply apparatuses according to the invention, when the unfreezing is determined to be necessary, if a measurement time after a start of the unfreezing exceeds the calculated necessary time, the injection permitting means preferably gives a permission signal for the injection control and the injection permitting means is preferably does not reset the measurement time and the necessary time when a startup switch of the internal combustion engine is off and, when the speed of the internal combustion engine exceeds the predetermined threshold, resets the measurement time and the necessary time, starts measurement again, and calculates the necessary time.

In addition, in configuring the control apparatus for reducing agent supply apparatuses according to the invention, the unfreezing necessity determination means preferably determines the necessity of the unfreezing based on an atmospheric temperature or a temperature of a storage unit of the liquid reducing agent.

In addition, in configuring the control apparatus for reducing agent supply apparatuses according to the invention, the heating device preferably has a structure in which cooling water of the internal combustion engine is able to circulate and the unfreezing preferably starts when the internal combustion engine starts up.

In addition, in configuring the control apparatus for reducing agent supply apparatuses according to the invention, the heating device preferably has an electric heater, unfreezing control means for operating the electric heater when the necessity of the unfreezing is determined is preferably included, and the unfreezing preferably starts when the electric heater starts operating.

In addition, according to another aspect of the invention, there is provided a control method for reducing agent supply apparatuses that, when a liquid reducing agent is frozen, unfreezes the frozen liquid reducing agent using a heating device and enables injection control of the liquid reducing agent in an exhaust passage, the control method characterized by including determining necessity of unfreezing of the liquid reducing agent when a speed of the internal combustion engine exceeds a predetermined threshold during startup of the internal combustion engine and calculating a necessary time required for the unfreezing and permitting injection control of the liquid reducing agent when the unfreezing is not necessary or the unfreezing is completed.

According to the invention, the necessity of the unfreezing of a liquid reducing agent is determined when the internal combustion engine starts up and its speed exceeds a predetermined threshold. Accordingly, since the necessity of unfreezing is determined at the time when the internal combustion engine is actually started up, even if the liquid reducing agent is frozen, injection control can be started after appropriately waiting for unfreezing.

DETAILED DESCRIPTION

A control apparatus and control method for reducing agent supply apparatuses according to an embodiment of the present invention will be described specifically with reference to the drawings as appropriate.

In the drawings, components with the same reference numeral represent the same component unless otherwise specified and descriptions are omitted as appropriate.

Figure 1:
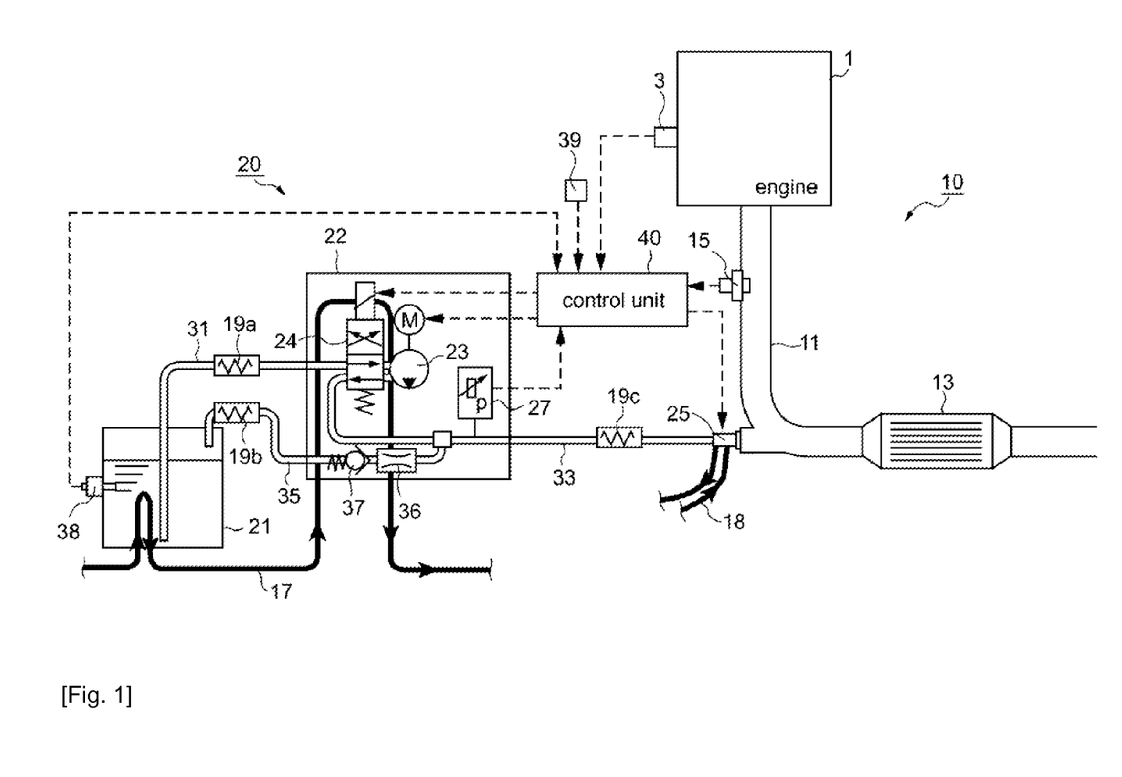
FIG. 1 shows the entire structure of an exhaust purifying apparatus including a reducing agent supply apparatus according to an embodiment of the present invention.

FIG. 1 shows an example of the entire structure of an exhaust purifying apparatus 10 including a reducing agent supply apparatus 20.

This exhaust purifying apparatus 10 purifies $NO_X$ in an exhaust gas and is provided in an exhaust passage 11 of an internal combustion engine (not shown) such as a diesel engine. The exhaust purifying apparatus 10 includes a reduction catalyst 13 installed at an intermediate point in the exhaust passage 11 and the reducing agent supply apparatus 20 for supplying a liquid reducing agent to the part of the exhaust passage 11 upstream of the reduction catalyst 13.

The reduction catalyst 13 has a function of promoting the reduction reaction of $NO_X$ in an exhaust gas and absorbs a reducing component generated from a liquid reducing agent and selectively reduces $NO_X$ in an exhaust gas flowing into the catalyst using the reducing component. In the reducing agent supply apparatus 20, an aqueous urea solution is used as the liquid reducing agent and the aqueous urea solution is decomposed in the exhaust passage 11 to generate ammonia as a reducing component. Upstream of the reduction catalyst 13, an exhaust temperature sensor 15 is provided upstream of the reducing agent supply apparatus 20.

In FIG. 1, the reducing agent supply apparatus 20 includes a storage tank 21, which is a storage unit accommodating a liquid reducing agent, a pump unit 22 pressure-feeding the liquid reducing agent, and a reducing agent injection valve 25 injecting the liquid reducing agent into the exhaust passage 11. The pump unit 22 includes a pump 23 and a passage selector valve 24. The driving of the reducing agent injection valve 25, the pump 23, and the passage selector valve 24 is controlled by an electronic control unit (ECU) 40.

The pump 23 and the storage tank 21 are interconnected by a first supply passage 31 and the pump 23 and the reducing agent injection valve 25 are interconnected by a second supply passage 33. In the second supply passage 33, a pressure sensor 27 for detecting the pressure in the second supply passage 33 (that is, the pressure of the liquid reducing agent pressure-fed to the reducing agent injection valve 25) is provided. The pump 23, the first supply passage 31, and the second supply passage 33 are interconnected via the passage selector valve 24.

The passage selector valve 24 has a function of switching the direction in which the liquid reducing agent pressure-fed by the pump 23 flows between the direction (referred to below as the forward direction) from the storage tank 21 to the reducing agent injection valve 25 and the direction (referred to below as the backward direction) from the reducing agent injection valve 25 to the storage tank 21. In the reducing agent supply apparatus 20, the passage selector valve 24 causes the first supply passage 31 to communicate with the suction side of the pump 23 and the second supply passage 33 communicate with the discharge side of the pump 23 in a non-energization state, and the first supply passage 31 communicate with the discharge side of the pump 23 and the second supply passage 33 communicate with the suction side of the pump 23 in an energization state.

That is, when the injection control of the liquid reducing agent is performed, the passage selector valve 24 is not energized to supply the liquid reducing agent toward the reducing agent injection valve 25. In this case, the liquid reducing agent flows in the forward direction. In contrast, in order to recover the liquid reducing agent in the reducing agent supply apparatus 20 to the storage tank 21 when the internal combustion engine stops, the passage selector valve 24 is energized. In this case, the liquid reducing agent flows in the backward direction.

The structure in which the liquid reducing agent can be recovered to the storage tank 21 is not limited to an example in which the passage selector valve 24 is provided. For example, the reversely rotatable pump 23 can be used to achieve the structure in which the liquid reducing agent can be recovered.

In addition, a return passage 35 is branched from an intermediate point in the second supply passage 33 with the other end connected to the storage tank 21. A narrow section 36 with a narrow flow area is provided at an intermediate point in the return passage 35 to keep the pressure in the second supply passage 33. In addition, a one-way valve 37 for preventing the liquid reducing agent from flowing from the storage tank 21 to the second supply passage 33 is provided in the part of the return passage 35 closer to the storage tank 21 than the narrow section 36. The one-way valve 37 may be omitted.

In the reducing agent supply apparatus 20 shown in FIG. 1, the pressure sensor 27 is provided in the pump unit 22. However, the pressure sensor 27 may be provided in any position as long as the pressure in the second supply passage 33 can be detected.

The pump 23 pressure-feeds the liquid reducing agent at a predetermined flow rate under energization control by the ECU 40. In the reducing agent supply apparatus 20 in FIG. 1, an electromagnetic pump is used as the pump 23 and the output (discharge flow rate) of the pump 23 increases as the driving duty ratio increases. This pump 23 also functions means for recovering the liquid reducing agent to the storage tank 21.

The open-close control of the reducing agent injection valve 25 is performed by the energization control by the ECU 40 in the operational state of the internal combustion engine so that a predetermined amount of the liquid reducing agent is injected into the exhaust passage 11. As the reducing agent injection valve 25, an electromagnetic on-off valve that is closed in the non-energization state and opened in the energization state is used. On the other hand, when the internal combustion engine stops, the reducing agent injection valve 25 is kept opened during recovery of the liquid reducing agent. This introduces air (exhaust gas) into the second supply passage 33 via the injection hole of the reducing agent injection valve 25 to facilitate the recovery of the liquid reducing agent to the storage tank 21.

In addition, the reducing agent supply apparatus 20 is provided with a heating device for unfreezing the frozen liquid reducing agent. Specifically, the first supply passage 31 and the second supply passage 33 are provided with electric heaters 19a and 19b as heating devices, respectively. In addition, the storage tank 21, the pump unit 22, and the reducing agent injection valve 25 are provided with cooling water passages 17 and 18 in which cooling water for an internal combustion engine 1 can circulate. During operation of the internal combustion engine 1, the temperature of cooling water becomes approximately 60 to 80 degrees and the cooling water passages 17 and 18 function as a heating device because the cooling water flows through the cooling water passages 17 and 18. Although not particularly shown in the drawings, the cooling water passage 17 in the storage tank 21 is disposed in the vicinity of an end of the first supply passage 31.

The electric heater or circulation of cooling water for the internal combustion engine 1 is an example of a heating device and another structure can be adopted.

Figure 2:
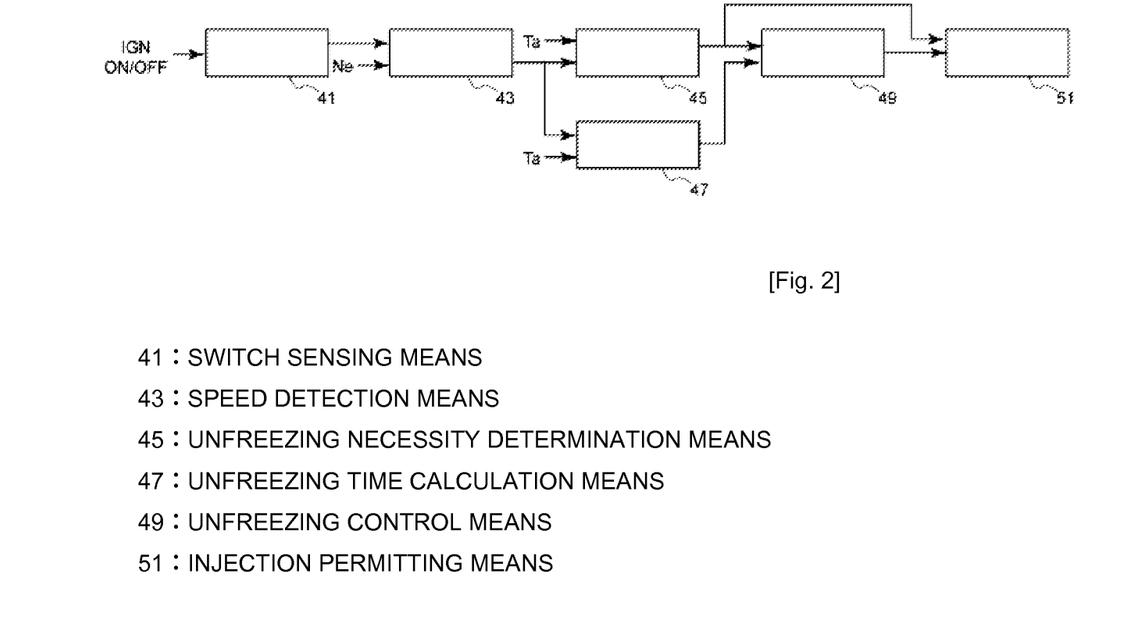
FIG. 2 is a block diagram showing the structure of a control apparatus for the reducing agent supply apparatus according to the embodiment of the present invention.

FIG. 2 is a structural example showing the functional blocks of the parts of the ECU 40 that concern the unfreezing control of the liquid reducing agent.

The ECU 40 is configured centering on a known microcomputer and includes switch sensing means 41, speed detection means 43, unfreezing necessity determination means 45, unfreezing time calculation means 47, unfreezing control means 49, and injection permitting means 51. Specifically, these components are achieved by causing the microcomputer to execute programs.

In addition to these components, the ECU 40 further includes storage elements (not shown) such as a RAM (random access memory) and a ROM (read only memory), a timer counter, a driving circuit for energization control of the pump 23, the passage selector valve 24, and the reducing agent injection valve 25, and so on. In addition, the ECU 40 can read an on-off signal of a startup switch for the internal combustion engine and signals of various sensors such as the exhaust temperature sensor 15 and an atmospheric temperature sensor 39.

The switch sensing means 41 detects the turn-on and -off of the startup switch of the internal combustion engine 1. In addition, the speed detection means 43 detects the speed (referred to below as the engine speed) Ne of the internal combustion engine 1 based on a sensor signal of a speed sensor 3 installed in the internal combustion engine 1.

The unfreezing necessity determination means 45 determines the necessity of the unfreezing of the liquid reducing agent based on a sensor signal of the atmospheric temperature sensor 39 after the engine speed Ne becomes equal to or more than a predetermined threshold Ne_thre. In the embodiment, the necessity of unfreezing is determined depending on whether an atmospheric temperature Ta detected by the atmospheric temperature sensor 39 is equal to or more than a threshold Ta_thre used to determine the freezing of the liquid reducing agent.

In addition, the unfreezing time calculation means 47 calculates the necessary time required to unfreeze the frozen liquid reducing agent. Specifically, the unfreezing time calculation means 47 obtains the time required until the freeze temperature is exceeded by heating the liquid reducing agent using an electric heater or the cooling water of the internal combustion engine on the assumption that the temperature of the frozen liquid reducing agent equals the temperature equivalent to the atmospheric temperature Ta at which the necessity of unfreezing is determined.

For example, in the storage tank 21 or the pump unit 22 having a heating device configured by the circulation passage of the cooling water of the internal combustion engine 1, since the cooling water starts circulating when the internal combustion engine 1 starts up, if the relationship between the temperature of the liquid reducing agent in the freeze state and the time from the startup of the internal combustion engine 1 until the temperature of the liquid reducing agent exceeds the freeze temperature is obtained in advance in an experiment or the like using a production machine, the time required for unfreezing can be calculated based on the atmospheric temperature Ta during determination of the necessity of unfreezing.

In addition, in the first supply passage 31, the second supply passage 33, and the return passage 35 having heating devices configured by the electric heaters 19a and 19b, if the relationship between the temperature of the liquid reducing agent in the freeze state and the time from the start of the operation of the electric heaters 19a and 19b until the temperature of the liquid reducing agent exceeds the freeze temperature is obtained in advance in an experiment or the like using a production machine, the time required for unfreezing can be calculated based on the atmospheric temperature Ta during determination of the necessity of unfreezing.

The unfreezing control means 49 is configured to energize the electric heaters 19a and 19b when the frozen liquid reducing agent needs to be unfrozen.

As described above, in the embodiment, the cooling water of the internal combustion engine 1 circulates in the cooling water passages 17 and 18 and the circulation of the cooling water does not need to be controlled. However, when there is a valve or the like for controlling circulation of the cooling water in the cooling water passages 17 and 18, the unfreezing control means 49 controls the operation of the valve or the like.

The injection permitting means 51 permits the injection control of the liquid reducing agent for the exhaust passage 11 of the internal combustion engine 1 when the unfreezing of the liquid reducing agent is unnecessary or the frozen liquid reducing agent has been unfrozen. According to the permission instruction, the control of the driving of the pump 23 and the reducing agent injection valve 25 is started.

Next, a specific example of a control method for the reducing agent supply apparatus 20 according to the embodiment performed by the ECU 40 will be described with reference to the timing chart in FIG. 4 and the flowchart in FIG. 5.

Before the control method for the reducing agent supply apparatus 20 according to the embodiment is described, a control method for reducing agent supply apparatuses as a comparison example will be first described with reference to the timing chart in FIG. 3.

In the control method in the comparison example, when the startup switch of the internal combustion engine 1 is turned on at time t1', the atmospheric temperature Ta at that time is read at time t2', the necessity of the unfreezing of the liquid reducing agent is determined based on the atmospheric temperature Ta, and the necessary time T_thre required for the unfreezing is set when the unfreezing is necessary. Next, at time t3', unfreezing control is started and the measurement of timer value T is started. In the timing chart in FIG. 3, at time t2', cranking is started and the internal combustion engine 1 starts up.

After that, when the timer value T reaches the necessary time T_thre at time t4', the unfreezing state is set to yes, the injection control of the liquid reducing agent is permitted (injection control on) at time t5', and the unfreezing control is stopped (unfreezing control off). After that, in the timing chart in FIG. 3, the atmospheric temperature Ta exceeds the threshold Ta_thre.

Next, when the startup switch of the internal combustion engine 1 is turned off at time t6', the engine speed Ne becomes zero and the injection control is completed (injection control off). At the same time, in the control method in the comparison example, the timer value T and the necessary time T_thre are reset and the unfreezing state is reset (unfreeze state no).

After that, the startup switch of the internal combustion engine 1 is turned on again at time t7', the atmospheric temperature Ta at that time is read at time t8', and the necessity of unfreezing is determined based on the atmospheric temperature Ta. Since the atmospheric temperature Ta exceeds threshold Ta_thre at this time, the ECU 40 determines that the liquid reducing agent is in the unfreezing state and the unfreezing control is unnecessary. Accordingly, the unfreezing state is set to yes and the necessary time T_thre required for unfreezing is not set at time t8'.

If the internal combustion engine 1 is kept stopped in this state, the atmospheric temperature Ta becomes lower than the threshold Ta_thre at time t9', and the internal combustion engine 1 is started at time t10', then the unfreezing state is kept yes even though the liquid reducing agent may have been frozen. Accordingly, the injection control of the liquid reducing agent is permitted at time t11'. As a result, $NO_X$ in exhaust gas may not be purified efficiently.

In contrast, in a control method in an example of the invention, the necessity of unfreezing is determined not when the startup switch of the internal combustion engine 1 is turned on, but when the engine speed Ne exceeds the threshold Ne_thre. Specifically, in the timing chart in FIG. 4, when the startup switch of the internal combustion engine 1 is turned on at time t1, the atmospheric temperature Ta at that time is read at time t2 at which the engine speed Ne exceeds the threshold Ne_thre, the necessity of the unfreezing of the liquid reducing agent is determined based on the atmospheric temperature Ta, and the necessary time T_thre required for unfreezing is set when unfreezing is necessary. In the example of the timing chart in FIG. 4, unfreezing is determined to be necessary since the atmospheric temperature Ta is lower than the threshold Ta_thre, and unfreezing is started and the measurement of the timer value T is started at time t3.

After that, when the timer value T reaches the necessary time T_thre at time t4, the unfreezing state is set to yes, the injection control of the liquid reducing agent is permitted at time t5 (injection control on), and the unfreezing control is stopped (unfreezing control off). In the timing chart in FIG. 4, after that, the atmospheric temperature Ta exceeds the threshold Ta_thre.

Next, when the startup switch of the internal combustion engine 1 is turned off at time t6, the engine speed Ne becomes zero and the injection control is completed (injection control off). At this time, in the control method according to the embodiment, the timer value T and the necessary time T_thre are kept without being reset and the unfreezing state is reset (unfreeze state no).

After that, it is assumed that the startup switch of the internal combustion engine 1 is turned on again at time t7, the internal combustion engine 1 is kept stopped, and the atmospheric temperature Ta becomes lower than the threshold Ta_thre at time t8. However, in the control method according to the embodiment, at time t9 at which the internal combustion engine 1 starts up and the engine speed Ne exceeds the threshold Ne_thre, the atmospheric temperature Ta at that time is read and the necessity of the unfreezing of the liquid reducing agent is determined.

That is, the timer value T and the necessary time T_thre at time t9 are reset once, the atmospheric temperature Ta at that time is read at the same time, the necessity of unfreezing is determined based on the atmospheric temperature Ta, and the necessary time T_thre required for unfreezing is set based on the atmospheric temperature Ta. In the example of the timing chart in FIG. 4, unfreezing control is determined to be necessary since the atmospheric temperature Ta is lower than the threshold Ta_thre, and the unfreezing control is started (unfreezing control on) and the measurement of the timer value T is started at time t10.

After that, when the timer value T reaches the necessary time T_thre at time t11, the unfreezing state is set to yes, the injection control of the liquid reducing agent is permitted at time t12 (injection control on), and the unfreezing control is stopped (unfreezing control off).

Next, the control method according to the embodiment shown in the timing chart in FIG. 4 will be described with reference to the flowchart shown in FIG. 5.

When detecting that the startup switch of the internal combustion engine 1 is turned on in step S10, the ECU 40 resets the status of the unfreezing state in step S11. That is, the unfreezing state is set to no.

Next, the ECU 40 repeats a determination as to whether the engine speed Ne exceeds the threshold Ne_thre in step S12 and, when the engine speed Ne exceeds the threshold Ne_thre (Yes determination), proceeds to step S13. In step S13, the ECU 40 resets the necessary time T_thre required for unfreezing and the timer value T that are set currently, and newly calculates and sets the necessary time Ta_thre required for unfreezing based on the atmospheric temperature Ta. At the same time, the necessity of the unfreezing of the liquid reducing agent is determined based on the atmospheric temperature Ta.

Next, the ECU 40 proceeds to step S14 and, when the unfreezing of the liquid reducing agent is necessary, proceeds to step S15 and starts the timer count. Then, in step S16, the ECU 40 waits for the timer value T to reach the threshold T_thre. When the timer value T reaches the threshold T_thre, the ECU 40 proceeds to step S17, determines that the liquid reducing agent has been unfrozen, and sets the unfreezing state to yes.

Next, the ECU 40 proceeds to step S18 and permits the injection control of the liquid reducing agent. When unfreezing is unnecessary in step S14 above, the ECU 40 proceeds to step S18 by skipping steps S15 to S17 and permits the injection control of the liquid reducing agent. After that, although not described in detail, the injection control of the liquid reducing agent is performed.

After that, the ECU 40 waits in step S19 until the turn-off of the startup switch of the internal combustion engine 1 is detected and, when the startup switch is turned off (Yes determination), proceeds to step S20, clears the unfreezing state, and completes this routine.

In the above control apparatus 40 and control method for the reducing agent supply apparatus 20 according to the embodiment, the necessity of the unfreezing of the liquid reducing agent is determined when the engine speed Ne exceeds the predetermined threshold Ne_thre after the internal combustion engine 1 starts up. Accordingly, since the necessity of unfreezing is determined when the internal combustion engine 1 actually starts up, if the liquid reducing agent is frozen, injection control is started after waiting for unfreezing appropriately.

The above control apparatus 40 and control method for the reducing agent supply apparatus 20 according to the embodiment represent one aspect of the invention and do not limit the invention, so they can be arbitrarily modified within the scope of the invention.

For example, in the above embodiment, the necessity of the unfreezing of the liquid reducing agent is determined based on the atmospheric temperature Ta detected by the atmospheric temperature sensor 39. However, the method for determining the necessity of unfreezing is not limited to this. For example, when there is a reducing agent temperature sensor 38 for detecting the temperature of the liquid reducing agent stored in the storage tank 21, the necessity of unfreezing may be determined based on the temperature of the reducing agent detected by the reducing agent temperature sensor 38.

Figure 3:
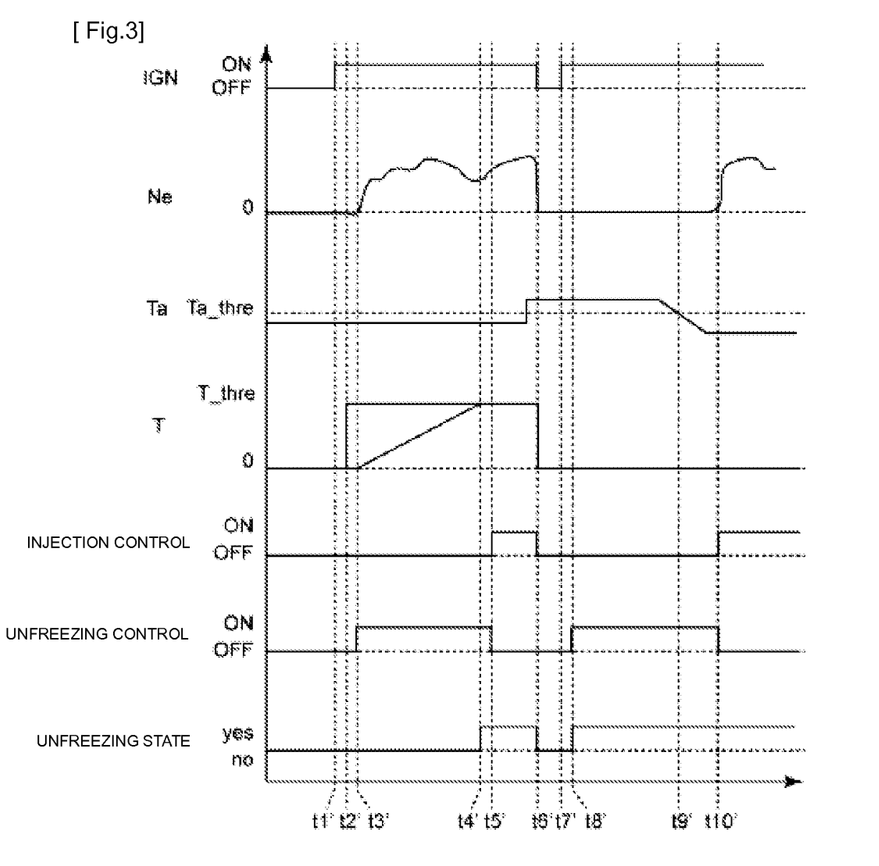
FIG. 3 is a timing chart showing a control method in a comparison example.
Figure 4:
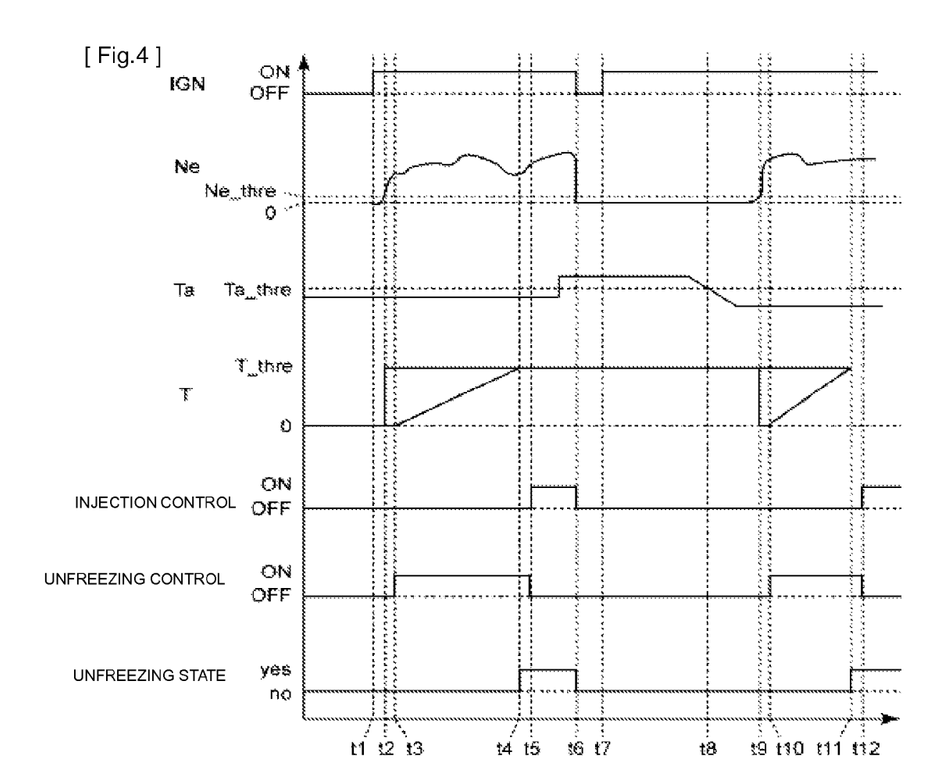
FIG. 4 is a timing chart showing a control method according to the embodiment of the invention.
Figure 5:
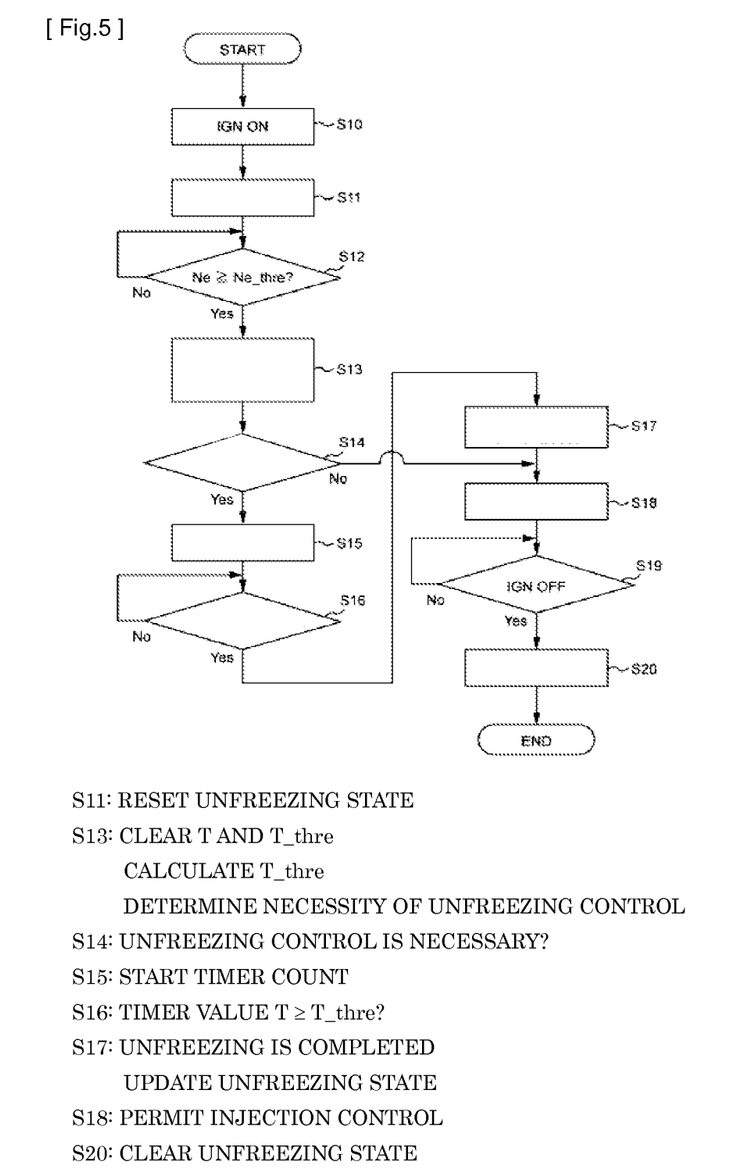
FIG. 5 is a flowchart showing the control method according to the embodiment of the invention.

In addition, in the above embodiment, as shown in FIGS. 3 and 4, the timer count is started as the electric heaters 19a and 19b starts operating after the necessity of the unfreezing of the liquid reducing agent is determined. However, when using a heating device in which cooling water circulates at the startup of the internal combustion engine 1, the timer count may be started at the same time with the necessity determination of unfreezing of the liquid reducing agent performed when the engine speed Ne exceeds the threshold Ne_thre.

The invention claimed is:

1. A control apparatus for reducing agent supply apparatuses that, when a liquid reducing agent is frozen, unfreezes the frozen liquid reducing agent, and enables injection control of the liquid reducing agent in an exhaust passage of an internal combustion engine, the control apparatus comprising:
a speed sensor for detecting a speed of the internal combustion engine;
a startup switch for starting the internal combustion engine; and
an electronic control unit configured to
detect the startup switch is turned on;
detect the speed of the internal combustion engine when the startup switch is turned on;
determine the speed of the internal combustion engine exceeding a predetermined threshold;
in response to the speed of the internal combustion engine exceeding the predetermined threshold, determine a necessity of unfreezing the liquid reducing agent, reset a necessary time required to unfreeze the liquid reducing agent, and calculate the necessary time required to unfreeze the liquid reducing agent;
control a heating device when the necessity of unfreezing is determined; and
when the unfreezing is not necessary or the unfreezing is completed, generate a permission instruction for injection control of the liquid reducing agent.

2. The control apparatus for reducing agent supply apparatuses according to claim 1, wherein
the unfreezing is completed when a measurement time after a start of the unfreezing exceeds the calculated necessary time, and the measurement time and the necessary time are not reset when the startup switch of the internal combustion engine is off.

3. The control apparatus for reducing agent supply apparatuses according to claim 1, the control apparatus further comprising a temperature sensor configured to detect an atmospheric temperature or a temperature of a storage unit of the liquid reducing agent,
wherein the electronic control unit is further configured to determine the necessity of the unfreezing based on the atmospheric temperature or a temperature of the storage unit of the liquid reducing agent.

4. The control apparatus for reducing agent supply apparatuses according to claim 2, wherein the heating device comprises a cooling water passage in which cooling water of the internal combustion engine is able to circulate, and wherein the electronic control unit is further configured to start unfreezing of the liquid reducing agent when the internal combustion engine starts up.

5. The control apparatus for reducing agent supply apparatuses according to claim 2, wherein the heating device comprises an electric heater, and wherein the electronic control unit is further configured to operate the electric heater when the necessity of the unfreezing is determined, and wherein the electronic control unit is further configured to start unfreezing of the liquid reducing agent when the electric heater starts operating.

6. A control method for reducing agent supply apparatuses that, when a liquid reducing agent is frozen, unfreezes the frozen liquid reducing agent using a heating device, and enables injection control of the liquid reducing agent in an exhaust passage of an internal combustion engine, the control method comprising:
detecting a startup switch for the internal combustion engine is turned on;
detecting the speed of the internal combustion engine when the startup switch is turned on;
determining the speed of the internal combustion engine exceeding a predetermined threshold;
in response to the speed of the internal combustion engine exceeding the predetermined threshold, determining a necessity of unfreezing of the liquid reducing agent, resetting a necessary time required to unfreeze the liquid reducing agent, and calculating the necessary time required for unfreezing;
controlling a heating device when the necessity of unfreezing is determined; and
permitting injection control of the liquid reducing agent when the unfreezing is not necessary or the unfreezing is completed.

* * * * *